United States Patent [19]
Johnson et al.

[11] Patent Number: 5,682,475
[45] Date of Patent: Oct. 28, 1997

[54] METHOD AND SYSTEM FOR VARIABLE PASSWORD ACCESS

[75] Inventors: William J. Johnson, Flower Mound; Owen W. Weber, Coppell, both of Tex.

[73] Assignee: International Business Machines Corporation, Armonk, N.Y.

[21] Appl. No.: 366,693

[22] Filed: Dec. 30, 1994

[51] Int. Cl.$^6$ .................................................. G06F 11/00
[52] U.S. Cl. .................... 395/188.01; 395/186; 380/23; 364/222.5; 364/286.4; 364/286.5
[58] Field of Search .................. 395/188.01, 186, 395/726, 725, 187.01; 380/4, 24, 25, 23; 364/222.5, 286.5, 261, 286.4, 260.81

[56] References Cited

U.S. PATENT DOCUMENTS

| | | | |
|---|---|---|---|
| 4,779,224 | 10/1988 | Moseley et al. | 364/900 |
| 4,970,504 | 11/1990 | Chen | 340/825.31 |
| 5,222,231 | 6/1993 | Gunji | 395/575 |
| 5,323,146 | 6/1994 | Glaschick | 340/825.34 |
| 5,375,243 | 12/1994 | Parzych et al. | 395/725 |
| 5,430,867 | 7/1995 | Gunji | 395/575 |
| 5,475,839 | 12/1995 | Watson et al. | 395/650 |

OTHER PUBLICATIONS

Perry, O. R., Password Verification, IBM Technical Disclosure Bulletin, 11–72, pp. 1943–1944.

Christy, G. et al. Mechanism For Secure Off–Site Computer Access, IBM Technical Disclosure Bulletin, 04–85, pp. 6754–6756.

Dean, M. C. et al, Method To Provide Password Security Without Storing Password, IBM Technical Disclosure Bulletin, 08–87, p. 1068.

Clarke Jr., G. L. et al, Flexible Password Protection Scheme For A C2 Security/Electrically Erasable Programmable Read Only Memory Controller, IBM Technical Disclosure Bulletin, vol. 37, N9, 09–94, pp. 257–260.

Najjar, L. J., Published in International Technology Disclosures, vol. 10, N1, 01–92, Graphical Passwords.

US patent application Ser. No. 07/993,283, filed Dec. 17, 1992, assigned to applicant.

*Primary Examiner*—Robert W. Beausoliel, Jr.
*Assistant Examiner*—Dieu-Minh Le
*Attorney, Agent, or Firm*—Norman L. Gundel

[57] ABSTRACT

A method and system are provided for controlling access to a data processing system through the use of a variable password. In one embodiment, the invention substitutes the value of a variable into an expression contained in a predefined password, evaluates the expression and password, and compares the result of the valuation of the password to a character string input to the data processing system, granting access if they are identical. A range of values of certain characters of the password may be permitted. The password may require that certain characters be entered within a defined time interval measured from the entry of other characters. The values of environment variables, which are referenced by the variable password, may change from time to time, as a function, for example, of the current time or temperature or system utilization.

9 Claims, 3 Drawing Sheets

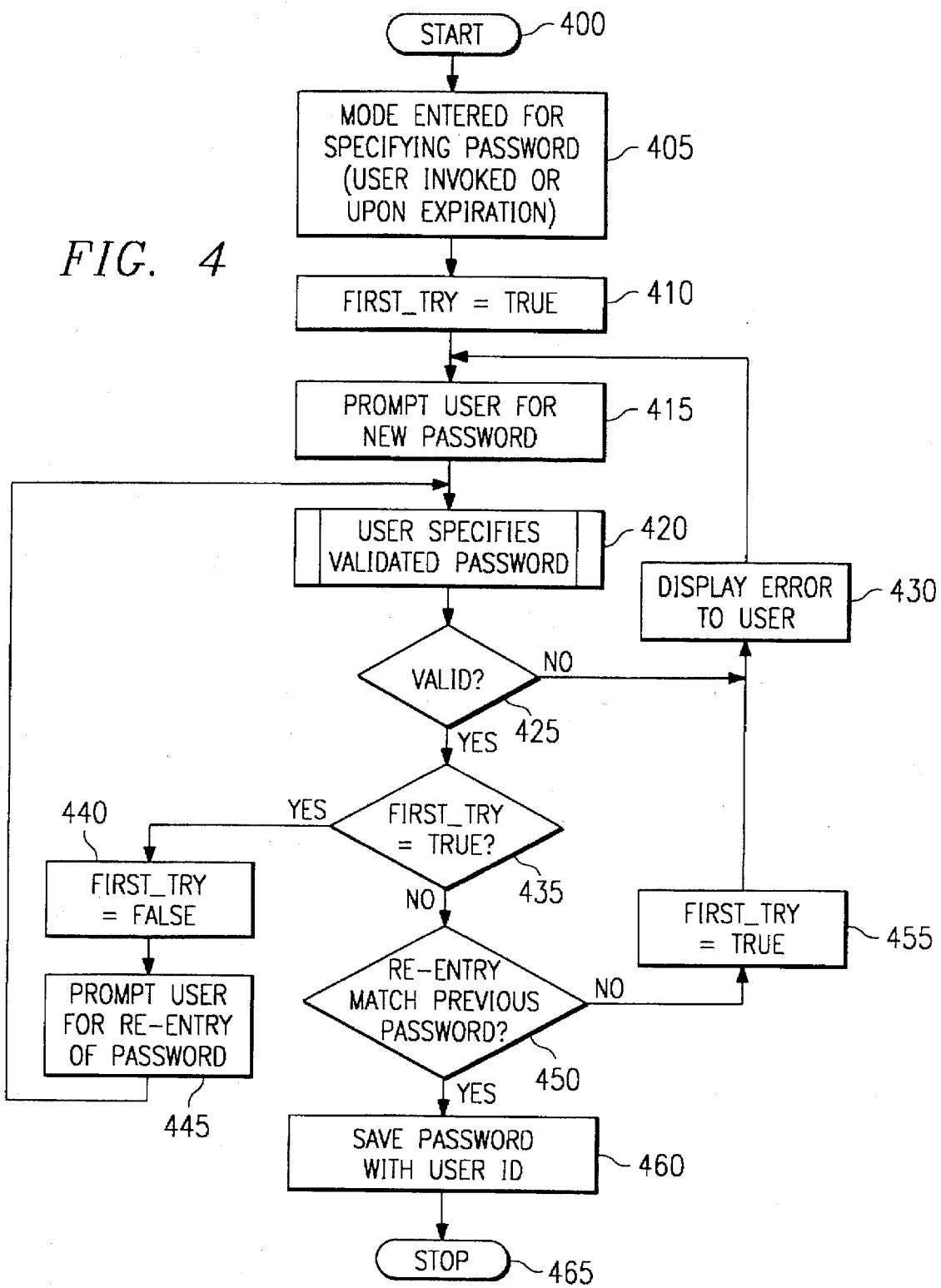

METHOD AND SYSTEM FOR VARIABLE PASSWORD ACCESS

BACKGROUND OF THE INVENTION

1. Field of the Invention

The present invention relates to data processing system access control and more particularly to access control using a password that varies in accordance with a function.

2. Description of the Related Art

Passwords are used to control access to many different types of data processing systems. Entry of a password may be required to log-on to a network or a host, or to open a standalone application. Entry of a password may be required to access certain data. Entry of a password, called a Personal Identification Number or PIN, may be required for electronic use of a particular debit card or credit card. Entry of a keyed or voiced password may be required for use of telephone answering systems that may be used, for example, to retrieve or record voice mail or to retrieve or conduct financial transactions. Entry of a password may be required for access to buildings.

Entry of a correct password may be sufficient to grant a person or account, called a user, access to a data processing system. Alternatively, the user may be known to the data processing system by a unique userid and that unique userid may have a unique password associated with it. To gain access to the data processing system, the user first enters his userid and then enters his password. The data processing system first determines whether the userid is valid, that is, whether the userid is included among those userids that authorize access to the data processing system. The data processing system then determines whether a password previously associated with the valid userid is the same as the password entered by the user, and if so, grants access.

A password, and a userid if required, may be entered in different ways. A userid may be read from the magnetic stripe of a credit card or identification badge. A fixed alphanumeric password is both convenient and economical. It is easily assigned, changed and cancelled and may be easily entered on existing data processing equipment. An alphanumeric character string may be entered at a typewriter-style keyboard. A numerical password may be keyed into a DTMF tone telephone, upon which number keys may be substituted for alpha characters.

Passwords may be assigned by the data processing system or selected by the user. Password rules may require minimum or maximum lengths or certain character types in certain positions. For example, a data processing system may require a password 6 to 24 alphanumeric characters in length with the first and last characters being alphabetic and at least one of the intervening characters being numeric. Passwords may be valid until voluntarily changed by the user or they may expire, requiring the provision or the selection of a new password. Passwords and userids may be included in sign-on scripts. Data processing system rules may prohibit the inclusion of passwords or userids in sign-on scripts.

However, fixed alphanumeric passwords are vulnerable to security breaches. The keyed entry of a fixed alphanumeric password can be visually observed by unauthorized persons, even where the display of the keyed characters on video displays and printers is suppressed. A password transmitted over telephone or networks can be misdirected or intercepted, either intentionally or inadvertently. Once known to another, the security of a fixed alphanumeric password is compromised, as it may be used repeatedly without authorization until the breach is discovered and corrected, or until it may expire.

Single use alphanumeric passwords seek to minimize the inherent security risk of unauthorized interception and reuse of fixed alphanumeric passwords. A user receives multiple unique passwords, each usable only once. However, a user, who may memorize a single password, is more likely to carry a written list of these multiple passwords, increasing the risk that the list may be compromised. Additionally, the inconvenience of a forgotten password, and the security risks of the process of reissuing passwords, increases with single use passwords.

Fingerprints, voiceprints and photographs may also serve as userids or passwords. Although difficult or impossible to duplicate, they require expensive equipment both to issue and to control access-equipment which may have no other use to the data processing system.

Thus an enhanced security password access control system is needed that retains the economy and convenience of fixed alphanumeric password access control.

SUMMARY OF THE INVENTION

In accordance with the present invention, a method and data processing system are disclosed for controlling access to a data processing system through the use of a variable password. In one embodiment, the invention substitutes the value of a variable into an expression contained in a predefined password, evaluates the expression and password, and compares the result of the valuation of the password to a character string input to the data processing system, granting access if they are identical. A range of values of certain characters of the password may be permitted. The password may require that certain characters be entered within a defined time interval measured from the entry of other characters. The values of environment variables, which are referenced by a variable password, may change from time to time, as a function, for example, of the current time or temperature or system utilization.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 4 is a high level logic flowchart illustrating the method of the present invention for specifying a variable password.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
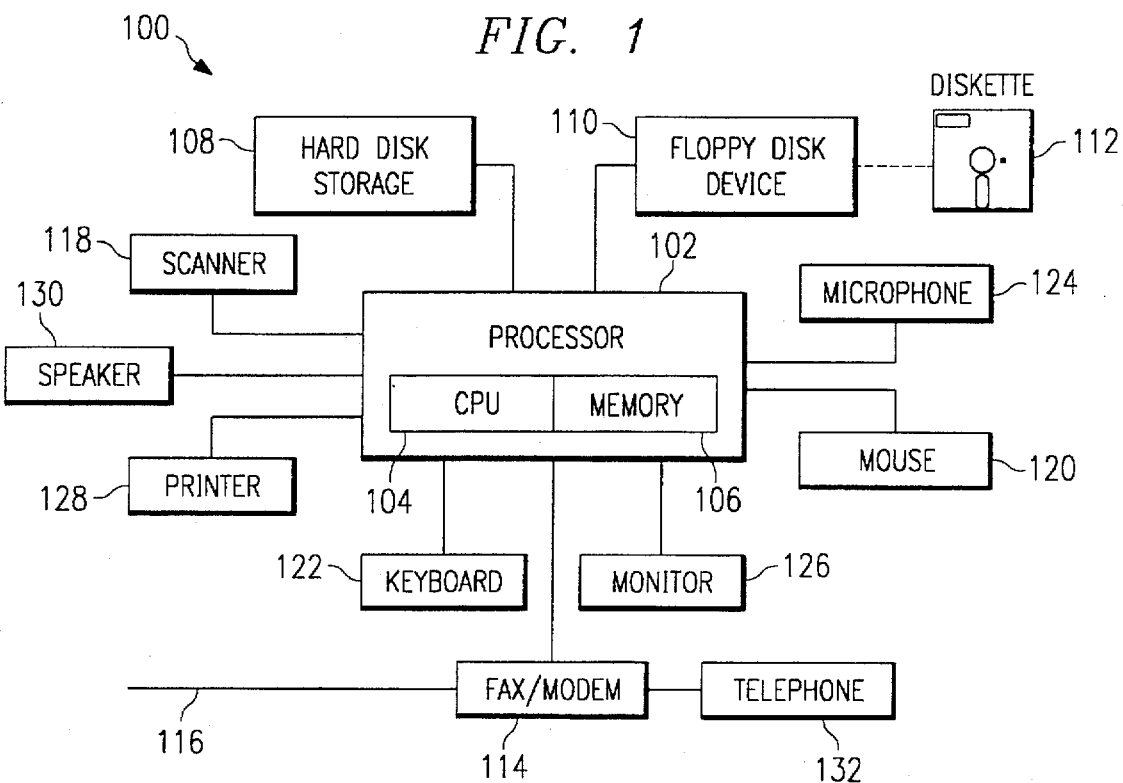
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, a data processing system 100 which may be used to implement the method and apparatus of the present invention. The data processing system 100 may preferably be an IBM PC computer running the IBM OS/2 Warp Version 3 operating system (trademarks of IBM Corp.). The data processing system 100 includes a processor 102, which includes a central processing unit (CPU) 104 and memory 106. Additional memory, such as a hard disk file storage 108 and a removable media device 110 may be connected to the processor 102. Removable media device 110 may read from and, usually, write to removable media 112. Removable media 112 may be magnetic or optical, such as a floppy diskette or a magnetic tape or a compact disk-read only memory (CD-ROM), which may have computer program code recorded thereon that implements portions of the present invention in the data processing system 100. Inputs may also be received from a fax/modem 114 or network interface card, which is connected to a telephone line 116 or a local area or wide area network, and from a microphone 124. The data processing system 100 also includes user interface hardware, such as a mouse 120, a keyboard 122 and a scanner 118, for allowing user input to the processor 102. The data processing system 100 also includes visual display devices, such as a monochrome or color display monitor 126 and a monochrome or color display printer 128, for rendering visual information. The data processing system may also include an audio display device, such as a speaker 130 for rendering audio information. A telephone 132 may also be connected to the telephone line 116.

Figure 2:
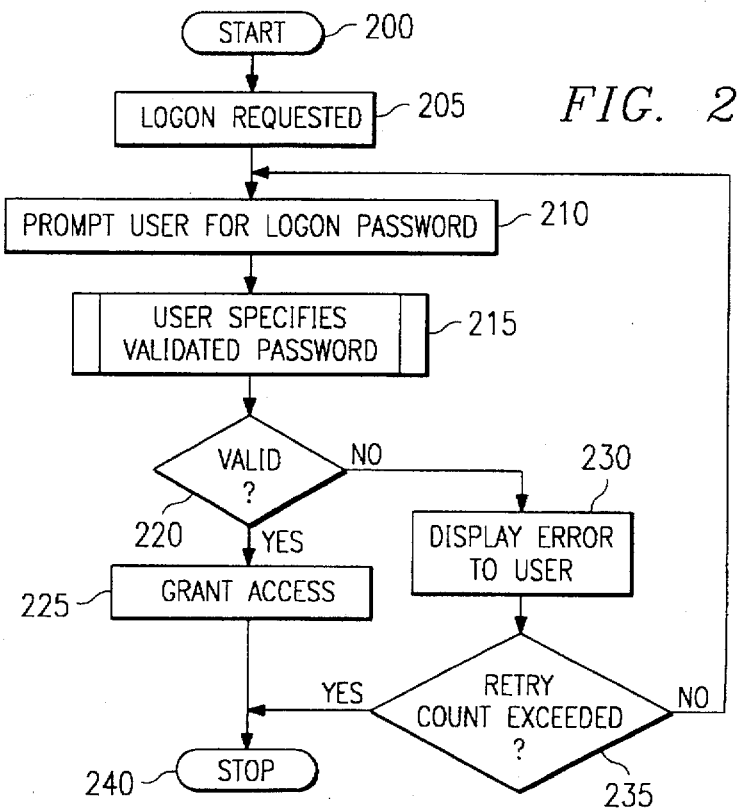
FIG. 2 is a high level logic flowchart illustrating the method of the present invention for receiving access to a data processing system by entering a variable password.

Referring now to FIG. 2, there is depicted a high level logic flowchart illustrating the operations preferred in carrying out the method of the present invention for receiving access to a data processing system by entering a variable password. The process begins at block 200 and passes to block 205 for receipt of a logon request from the user. The logon request may take the form of the conventional entry of a user identifier to the data processing system, such as a userid entered at a keyboard or read from a credit card, or a terminal ID as furnished by IBM Communications Manager/2 (trademark of IBM Corp.). This user identifier serves as a pointer within the data processing system to a valid password associated with the user identifier. Not all data processing systems associate a password with a user identifier; in some data processing systems, any user who enters a valid password is granted access.

After receiving a logon request, the process passes to block 210 and prompts the user for entry of a logon password. Next, in block 215, the process passes to the specification of valid password subroutine of FIG. 3 at block 300 for entry and validation of a logon password.

A logon password as used by this invention is a character string formed from a concatenated list of expressions such that each expression derives a resulting character string. In the preferred embodiment, floating point numbers derived from any expression may be truncated to the right of the decimal point and the resulting integer string is used as the derived character string. A password may be made up of one or more expressions and has the following form, in which || is the concatenation operator:

Expression1 || Expression2 || . . . || ExpressionJ

The derived password has the following form:

String1 || String2 || . . . || StringJ

An expression has the following form, in which "op" is an operator:

Term1 op Term2 op . . . op TermK

In the preferred embodiment, valid operators (op) are:

| Operators | Description |
|---|---|
| + | Addition |
| − | Subtraction |
| * | Multiplication |
| / | Division |
| ! | Factorial |

Operators are evaluated in conventional order. Parentheses may be used to modify the order of evaluation of operators.

In the preferred embodiment, valid terms include both constants and environment variables. Constants may be individual characters of a keyboard or telephone keypad; preferably, constants are some subset of all possible characters, such as the twenty-six alpha keys and ten numeric keys of a keyboard or the ten number keys of a telephone keypad. Environment variables are not constant, but vary from time to time, preferably as a function of the current time or temperature or system utilization. The preferred embodiment permits the following terms, which include both constants (characters) and environment variables (the other terms):

| Terms | Syntax |
|---|---|
| Characters | none |
| Relative Date Time | \RDT(time_mask) |
| Filesize by path | \BYTES(z:\dir1\dirN\filenm.ext) |
| Number of files by path | \FILES(z:\dir1\. . .\dirN) |
| Number Processes Running | \PIDS |
| Number Threads Running | \TIDS |
| Temperature Fahrenheit | \TEMPF:n |
| Temperature Celsius | \TEMPC:n |

A time mask in the form of YY:MM:DD:HH:MM:SS:mm is used to specify the characters output by the \RDT term. Any legal nonnumeric character in the time mask outputs the value of that time unit for the current date or time. The number of characters determines the number of digits output. Any number in the time mask increases or decreases the output by the value of the number. Blanks in the time mask suppress output of that time unit. Unspecified right positions are assumed blank.

For example, at 3:33 pm on Dec. 30, 1994, the term \RDT(yy::dd) has the value "9430". The term \RDT (:mm::02) has the value "1217" (using 24 hour time, 15+2= 17). The term \RDT(−5::::85) has the value "918" (9 is the last digit of 94−5=89 and 18 is the last two digits of 33+85=118).

If the file c:\config.sys has a filesize of 638 bytes, then the term \BYTES(c:\config.sys) returns "638". A path to a directory may also be specified, thereby returning the sum of all of the file sizes found in the specified directory. The temperature terms allow a range to be defined. Thus, at 74 degrees F, \TEMPF:2 allows 74 plus or minus 2, or a range from "72" to "76".

An expression may be subjected to a time constraint which requires the user to enter the characters that satisfy the expression within a specified time interval. The time interval, specified in seconds, may be bounded by a minimum time, a maximum time, or both a minimum and a maximum time. If at least two characters must be entered to satisfy the expression, the time interval is measured from the entry of the first to the entry of the last required character. If the time constraint requires entry of only one character, the time interval is measured from the entry of the last character required to satisfy the preceding expression (or, if none, from the password prompt) to the entry of the character required by the time constraint. If no character need be entered to satisfy the time constraint, the time interval is measured from the entry of the last character required to satisfy the preceding expression (or, if none, from the password prompt) to the entry of the first character required to satisfy the next expression (or, if none, to the completion of the entry of the password):

Time constraint \TC(min_time, max_time, Expression) A password including a time constraint that requires entry of the characters that satisfy Expression2 in an interval of at least five but not more than seven seconds may appear thus:

Expression1 || \TC(5,7,Expression2) || . . . || ExpressionJ

Figure 3:
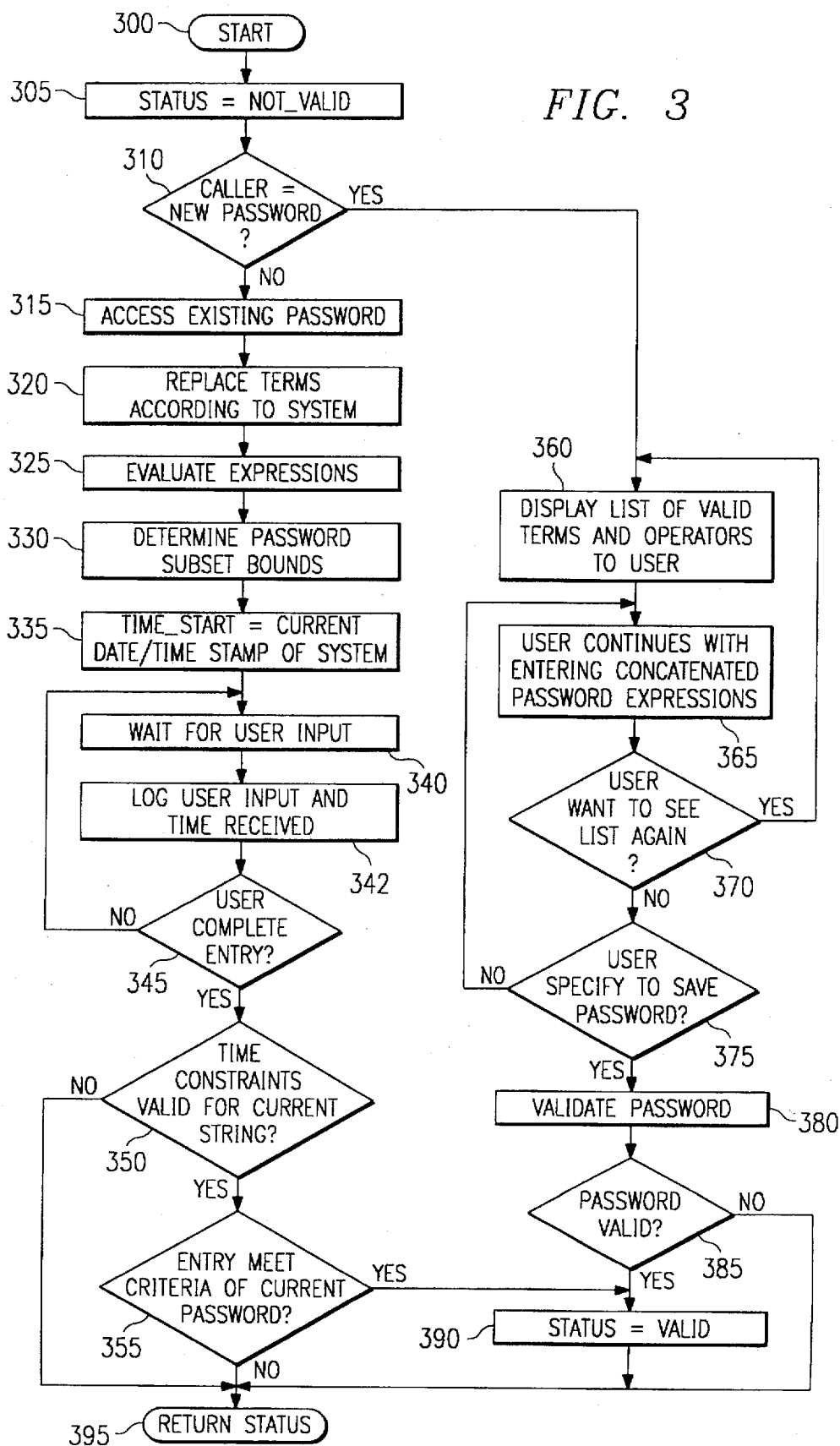
FIG. 3 is a high level logic flowchart illustrating a subroutine used in both the method of receiving access by entering a variable password of FIG. 2 and the method of specifying a variable password of FIG. 4.

Turning next to FIG. 3, the subroutine for specification of a valid password is shown. The subroutine is called and begins at block 300, then sets the variable STATUS to the value NOT_VALID in block 305. At block 310, the subroutine then determines from the calling routine whether the subroutine has been called for the purpose of specifying a new password. If not, as where the subroutine has been called by the process of FIG. 2, the subroutine passes to block 315 and access the existing valid password. As discussed above, a previously entered user identifier may serve as a pointer to the valid password associated with that user identifier.

The password may take the form of the following example:

\RDT(:::02)+\BYTES(c:\config.sys) || \TC(5,7,abcdefg) || \TEMPF:2 || (\PIDS+3) * 5 || xyz This example will be evaluated at 3:33 pm on Dec. 30, 1994 at 74 degrees F with 4 processes running where the filesize of c:\config.sys is 638 bytes.

The subroutine next passes from block 315 to 320 and replaces terms according to the present state of the data processing system. In the example:

\RDT(:::02)=17
\BYTES(c:\config.sys)=638
\TEMPF:2=74 plus or minus 2
\PIDS=4

Thus, after replacement:

17+638 || abcdefg || 74 || (4+3) * 5 || xyz

The subroutine next passes to block 325 and evaluates the expressions in the password:

655 || abcdefg || 74 || 35 || xyz and concatenates:

655abcdefg7435xyz

The subroutine then passes to block 330 to determine the password subset bounds such as are imposed by time constraints and allowable ranges. In the example, in the character string abcdefg, the "g" must be entered at least five and not more than seven seconds after the entry of the "a". Similarly, the "4" may be replaced by any digit between "2" and "6".

The subroutine then passes to block 335 and sets the variable TIME_START to the current date and time of the data processing system. The subroutine then passes to block 340 to wait for user input of the password.

After detecting a user input, the subroutine passes to block 342. The subroutine may also pass to block 342 if a defined period of time passes without receipt of user input. At block 342, the data processing system logs any user input received and the system time of its receipt, and passes to block 345.

At block 345, the subroutine determines whether the user has completed entry of the password. This may typically be performed by detection of the keyboard "enter" key or telephone "#" key, the entry of a certain number of characters, the passage of a defined time interval without the entry of a character or the passage of a time interval since the user was prompted to enter a password. If the user input received does not complete the entry of a password, the subroutine returns to block 340 to await further user input. If the entry of the password is complete, the subroutine passes to block 350.

At block 350, the subroutine determines whether the password entered meets any defined time constraints. In the example, the characters "abcdefg" must be entered in an interval of at least five and not more than seven seconds. These are the fourth through tenth characters of the password. The subroutine thus determines, from the log of user input and time received of block 342, whether the tenth character was entered at least five but not more than seven seconds after the time that the fourth character was entered.

If all defined time constraints are not met, the subroutine passes to block 395 and returns the value of the STATUS variable to the calling process of FIG. 2. This value was previously set to "NOT_VALID" in block 305. The subroutine also returns control to the calling process of FIG. 2 at block 220. If, instead, all defined time constraints are met, the subroutine passes from block 350 to block 355.

In block 355, the subroutine determines whether the characters received in block 340 and logged in block 342 match the characters required after evaluation in block 325 within the bounds determined in block 330. In the example, the following characters are required:

655abcdefg7435xyz

However, the subroutine permits the twelfth character, a "4" to vary from "2" to "6" and still meet the criteria If the subroutine determines that the criteria are not met, the subroutine passes to block 395 and returns the value of the STATUS variable to the calling process of FIG. 2. This value was previously set to "NOT_VALID" in block 305. However, if the subroutine determines that the criteria are met, the subroutine passes to block 390 and sets the variable STATUS to "VALID". The process proceeds to block 395 and returns the value of the STATUS variable to the calling process of FIG. 2. In either event, the subroutine returns control to the calling process of FIG. 2 at block 220.

Turning again to FIG. 2, block 220 determines whether the returned status is valid or not. If the status returned by the subroutine is "VALID", the process passes to block 225 and grants access to the user, and then passes to block 240 and terminates. If the status returned by the subroutine is not "VALID", the process proceeds from block 220 to block 230 and displays an error message to the user. The process then passes to block 235 and determines whether a retry count of the number of permitted attempts to enter the password has been exceeded. If not, the process returns to block 210 and prompts the user for entry of the logon password. If the retry count has been exceeded, the process terminates.

With reference now to FIG. 4, there is depicted a high level logic flowchart which illustrates the method of a preferred embodiment of the present invention for specifying a variable password. The process begins at block 400, typically after access to the data processing system has been received, as by the process described in FIG. 2. From block 400, the process passes to block 405 and enters a mode for specifying a new password. This mode may be entered either by user election or upon the expiration of a time period since the specification of the current password.

The process then passes to block 410 and sets the value of the variable FIRST_TRY to "TRUE". The process then passes to block 415 and prompts the user for entry of the new password. Upon receipt of the user input password, the process passes to block 420 and calls the subroutine of FIG. 3 at block 300.

Turning again to FIG. 3, the subroutine is called and begins at block 300, then sets the variable STATUS to the value NOT_VALID in block 305. At block 310, the subroutine then determines from the calling routine whether the subroutine has been called for the purpose of specifying a new password. If so, as where the subroutine has been called by the process of FIG. 4, the subroutine passes to block 360 and displays a list of valid terms and operators to use. An example of such a list is set forth above following the first reference to the subroutine of FIG. 3.

From block 360, the subroutine proceeds to block 365 and allows the user to enter the terms and operators that form the expressions used to define the password, as described above. The subroutine then passes to block 370 to determine whether the user wishes to see the list of terms and operators again. if so, the subroutine returns to block 360, described above. if not the subroutine passes to block 375 to determine whether the user has specified to save the password, completing its entry. If not, the subroutine returns to block 365 to permit further user entry.

If the user has specified to save the password, the subroutine proceeds from block 375 to block 380 to validate the password by determining whether the password input by the user is syntactically correct in accordance with the rules of the various permitted operators, terms expressions, time constraints and concatenations, as described above. The subroutine then passes to block 385 and, if the subroutine determines that the password is not valid, the subroutine passes from block 385 to block 395 and returns the value of the STATUS variable to the calling process of FIG. 4. This value was previously set to "NOT_VALID" in block 305. However, if the subroutine determines that the password is valid, the subroutine passes from block 385 to block 390 and sets the variable STATUS to "VALID". The subroutine proceeds to block 395 and returns the value of the STATUS variable to the calling process of FIG. 4. In either event, the subroutine returns control to the calling process of FIG. 4 at block 425.

Turning again to FIG. 4, block 425 determines whether the returned status is valid or not. If the status returned by the subroutine is not "VALID", the process proceeds from block 425 to block 430 and displays an error message to the user. The process then returns to block 415 and prompts the user for entry of a new password.

If the status returned by the subroutine is "VALID", the process passes from block 425 to block 435 and determines whether the value of the variable FIRST_TRY is "TRUE". If so, the process passes to block 440 and sets the value of the variable FIRST_TRY to "FALSE". The process then passes to block 445 and prompts the user to reenter the password, and then passes to the subroutine of FIG. 3 at block 300, as described above. Upon completion, the subroutine returns control to block 425 of FIG. 4, also as described above.

Turning again to block 435 of FIG. 4, if the process determines that the value of the variable FIRST_TRY is not "TRUE", the process passes to block 450 to determine whether the most recent valid new password entered matches the previously entered valid new password. If not, the process passes to block 455, sets the value of the variable FIRST_TRY to "TRUE", and then returns to block 415 and prompts the user for entry of the new password.

If the most recent and the previously entered valid new passwords match, the process passes from block 450 to block 460. There, the valid new password is saved in association with the proper user identifier, if used, replacing any previous password. The process then proceeds to block 465 and terminates.

Other operators, such as <, >, <=, >=, AND, OR, XOR, and so forth may be implemented to produce numerical Boolean results such as "1" or "0" for character positions in a password. Many operators, including exponentiation, summation, and so forth may be implemented without departing from the Spirit and scope of the invention. Furthermore, many possible forms of environment variables may exist in a particular environment and the examples illustrated herein are not meant to limit the scope of the invention.

While the invention has been particularly shown and described with reference to a preferred embodiment and process, it will be understood that various changes in form and detail may be made therein without departing from the spirit and scope of the invention.

What is claimed is:

1. A method, performed in a data processing system, for granting access to the data processing system, said data processing system including a predefined time interval, an environment variable, and a multiple character stored password, said stored password having specified first and second characters and a specification of a third character whose identity is dependent upon a value of the environment variable and an arithmetic operation to be performed upon the environment variable such that the identity of the third character is not equal to the value of the environment variable, wherein said third character may be one of said first and second characters, the method comprising the computer implemented steps of:

accepting an input of a multiple character keyed-in password, said keyed-in password including characters that correspond to the specified first and second characters of the stored password, said keyed-in password further including a character corresponding to the third character of the stored password;

determining whether the identity of the character corresponding to the third character of the stored password is equal to the result of performing the arithmetic operation on the environment variable;

determining the length of time elapsed between the inputting of the corresponding first character of the keyed-in password and the inputting of the corresponding second character of the keyed-in password; and granting access to the data processing system if the determined length of time elapsed is within the predefined time interval and if the identity of the character corresponding to the third character of the stored password is equal to the result of performing the arithmetic operation on the environment variable.

2. The method of claim 1 wherein the predefined time interval includes a predefined range of time.

3. The method of claim 1 wherein the value of the environment variable includes a range of values and wherein the value of the character whose identity is dependent upon the value of the environment variable also includes a range of values.

4. A data processing system, comprising:

a predefined time interval;

an environment variable;

a multiple character stored password, said stored password having specified first and second characters and a specification of a third character whose identity is dependent upon a value of the environment variable and an arithmetic operation to be performed upon the environment variable such that the identity of the third character is not equal to the value of the environment variable, wherein said third character may be one of said first and second characters;

means for accepting an input of a multiple character keyed-in password, said keyed-in password including characters that correspond to the specified first and second characters of the stored password, said keyed-in password further including a character corresponding to the third character of the stored password;

means for determining whether the identity of the character corresponding to the third character of the stored password is equal to the result of performing the arithmetic operation on the environment variable;

means for determining the length of time elapsed between the inputting of the corresponding first character of the keyed-in password and the inputting of the corresponding second character of the keyed-in password; and means for granting access to the data processing system if the determined length of time elapsed is within the predefined time interval and if the identity of the character corresponding to the third character of the stored password is equal to the result of performing the arithmetic operation on the environment variable.

5. The data processing system of claim 4 wherein the predefined time interval includes a predefined range of time.

6. The data processing system of claim 4 wherein the value of the environment variable includes a range of values and wherein the value of the character whose identity is dependent upon the value of the environment variable also includes a range of values.

7. A computer program product, for use in a data processing system, for granting access to the data processing system, said data processing system including a predefined time interval, an environment variable, and a multiple character stored password, said stored password having specified first and second characters and a specification of a third character whose identity is dependent upon a value of the environment variable and an arithmetic operation to be performed upon the environment variable such that the identity of the third character is not equal to the value of the environment variable, wherein said third character may be one of said first and second characters, the computer program product comprising:

a computer usable medium having computer readable program code embodied in said medium for granting access to the data processing system, said computer program product including:

computer readable program code means for accepting an input of a multiple character keyed-in password, said keyed-in password including characters that correspond to the specified first and second characters of the stored password, said keyed-in password further including a character corresponding to the third character of the stored password;

computer readable program code means for determining whether the identity of the character corresponding to the third character of the stored password is equal to the result of performing the arithmetic operation on the environment variable;

computer readable program code means for determining the length of time elapsed between the inputting of the corresponding first character of the keyed-in password and the inputting of the corresponding second character of the keyed-in password; and computer readable program code means for granting access to the data processing system if the determined length of time elapsed is within the predefined time interval and if the identity of the character corresponding to the third character of the stored password is equal to the result of performing the arithmetic operation on the environment variable.

8. The computer program product of claim 7 wherein the predefined time interval includes a predefined range of time.

9. The computer program product of claim 7 wherein the value of the environment variable includes a range of values and wherein the value of the character whose identity is dependent upon the value of the environment variable also includes a range of values.

* * * * *